(12) United States Patent
Rub et al.

(10) Patent No.: US 9,104,510 B1
(45) Date of Patent: Aug. 11, 2015

(54) MULTI-FUNCTION FLOATING POINT UNIT

(75) Inventors: Leonardo Rub, Sunnyvale, CA (US);
Dana Massie, Santa Cruz, CA (US);
Samuel Dicker, San Francisco, CA (US)

(73) Assignee: Audience, Inc., Mountain View, CA (US)

( * ) Notice: Subject to any disclaimer, the term of this patent is extended or adjusted under 35 U.S.C. 154(b) by 958 days.

(21) Appl. No.: 12/772,146

(22) Filed: Apr. 30, 2010

Related U.S. Application Data

(60) Provisional application No. 61/227,381, filed on Jul. 21, 2009.

(51) Int. Cl.
*G06F 7/38* (2006.01)
*G06F 7/544* (2006.01)

(52) U.S. Cl.
CPC .................... *G06F 7/5443* (2013.01)

(58) Field of Classification Search
CPC ..... G06F 7/57; G06F 7/5443; G06F 9/30014; G06F 2207/3828; G06F 9/30036
USPC ......................................... 708/520, 523–524
See application file for complete search history.

(56) References Cited

U.S. PATENT DOCUMENTS

| | | | | |
|---|---|---|---|---|
| 4,757,466 A * | 7/1988 | Miyaoka et al. | ............... | 708/524 |
| 4,807,183 A * | 2/1989 | Kung et al. | ................... | 708/520 |
| 5,187,796 A * | 2/1993 | Wang et al. | ................... | 708/520 |
| 5,424,969 A * | 6/1995 | Yamada et al. | ............... | 708/523 |
| 5,657,262 A * | 8/1997 | Curtet | .......................... | 708/523 |
| 6,240,437 B1 * | 5/2001 | Guttag et al. | ................. | 708/524 |
| 6,480,872 B1 * | 11/2002 | Choquette | ..................... | 708/523 |
| 7,225,323 B2 * | 5/2007 | Siu et al. | ........................ | 708/523 |
| 2004/0225704 A1 * | 11/2004 | Cambonie | ..................... | 708/523 |
| 2008/0114826 A1 * | 5/2008 | Mejdrich et al. | .............. | 708/523 |
| 2009/0158013 A1 * | 6/2009 | Muff et al. | ..................... | 712/222 |

* cited by examiner

*Primary Examiner* — Tan V. Mai
(74) *Attorney, Agent, or Firm* — Carr & Ferrell LLP

(57) ABSTRACT

Arithmetic units and methods for floating point processing are provided. In exemplary embodiments, data paths to and from multiple multipliers and adders are flexibly combined through crossbars and alignment units to allow a wide range of mathematical operations, including affine and SIMD operations. The micro-architecture for a high-performance flexible vector floating point arithmetic unit is provided, which can perform a single-cycle throughput complex multiply-and-accumulate operation, as well as a Fast Fourier Transform (radix-2 decimation-in-time) Butterfly operation.

19 Claims, 12 Drawing Sheets

|       | AFF_L | AFF_H | BFLY_L | BFLY_H | SIMD |
|-------|-------|-------|--------|--------|------|
| M0_a  | X0    | X0    | Y0     | Y2     | X0   |
| M0_b  | Y0    | Y0    | W0     | W0     | Y0   |
| M1_a  | X1    | X1    | Y1     | Y3     | X1   |
| M1_b  | Y1    | Y1    | W1     | W1     | Y1   |
| M2_a  | X2    | X2    | Y0     | Y2     | X2   |
| M2_b  | Y2    | Y2    | W1     | W1     | Y2   |
| M3_a  | X3    | X3    | Y1     | Y3     | X3   |
| M3_b  | Y3    | Y3    | W0     | W0     | Y3   |

|       | CMAC_L | CMAC_H | INTRP_L | INTRP_H |
|-------|--------|--------|---------|---------|
| M0_a  | X0     | X2     | X0      | X2      |
| M0_b  | Y0     | Y2     | W0      | W0      |
| M1_a  | X1     | X3     | Y0      | Y2      |
| M1_b  | Y1     | Y3     | W0      | W0      |
| M2_a  | X0     | X2     | X1      | X3      |
| M2_b  | Y1     | Y3     | W1      | W1      |
| M3_a  | X1     | X3     | Y1      | Y3      |
| M3_b  | Y0     | Y2     | W1      | W1      |

WXY minibar

FIG. 3

FIRST DUAL ADDER

|    | AFF_L | AFF_H | BFLY_L | BFLY_H | SIMD |
|----|-------|-------|--------|--------|------|
| A0 | Z0    | Z2    | X0     | X2     | Z0   |
| A1 | P0    | P0    | P0     | P0     | P0   |
| A2 | P1    | P1    | P1     | P1     | 0    |
| B0 | 0     | 0     | X0     | X2     | Z2   |
| B1 | 0     | 0     | P0     | P0     | P2   |
| B2 | 0     | 0     | P1     | P1     | 0    |

SECOND DUAL ADDER

|    | AFF_L | AFF_H | BFLY_L | BFLY_H | SIMD |
|----|-------|-------|--------|--------|------|
| A0 | Z1    | Z3    | X1     | X3     | Z1   |
| A1 | P2    | P2    | P2     | P2     | P1   |
| A2 | P3    | P3    | P3     | P3     | 0    |
| B0 | 0     | 0     | X1     | X3     | Z3   |
| B1 | 0     | 0     | P2     | P2     | P3   |
| B2 | 0     | 0     | P3     | P3     | 0    |

Adder input minibar

FIG. 4

| 32 bits Float | | |
|---|---|---|
| Sign | Exponent | Mantissa |
| 1 | 6 | 25 (+1 implicit bit) |

| 16 bits Float | | |
|---|---|---|
| Sign | Exponent | Mantissa |
| 1/0 | 2-6 | 9-14 (+1 implicit bit) |

| 8 bits Float | | |
|---|---|---|
| Sign | Exponent | Mantissa |
| 1/0 | 2-6 | 1-6 (+1 implicit bit) |

FIG. 11A

| Bit number: | 25 (HiddenBit) | 24 | 23 | 22 | ... | 3 | 2 | 1 | 0 |
|---|---|---|---|---|---|---|---|---|---|
| Weighting: | $2^{-1}$ | $2^{-2}$ | $2^{-3}$ | $2^{-4}$ | ... | $2^{-23}$ | $2^{-24}$ | $2^{-25}$ | $2^{-26}$ |

MULTI-FUNCTION FLOATING POINT UNIT

CROSS REFERENCE TO RELATED APPLICATIONS

This application claims the benefit of U.S. Provisional Application No. 61/227,381, filed on Jul. 21, 2009, entitled "Multi-Function Floating Point Unit," having inventors Leonardo Rub, Dana Massie, and Samuel Dicker, which is hereby incorporated by reference in its entirety.

BACKGROUND

Today, many microprocessors and digital signal processor (DSP) chips exist, such as the Intel Pentium family, the ARM microprocessors used in many portable consumer electronics devices, and Texas Instruments DSP chips such as the TI64xx family, which have multiple arithmetic functional units for performing calculations. Typically, these chips have integer arithmetic units for performing integer calculations, and floating point units (FPUs) for performing floating point format operations. Floating point is a way to represent numbers using an exponent and a mantissa and a sign bit, which offers wide dynamic range.

Floating point operation performance is limited both because traditional micro-architectures fail to support a sufficiently wide variety of operation types, and because vector operations are necessarily slowed down by required data permutations before or after the floating point operations.

SUMMARY OF THE INVENTION

In some embodiments, the present technology includes an arithmetic unit that includes a flexible vector arithmetic unit to perform a set of floating point arithmetic operations efficiently. The unit can include four or more floating point multipliers and four or more floating point adders. In some embodiments, other numbers of multipliers and adders can be implemented. The multipliers and adders are interconnected in a flexible way to allow multiple operations, including SIMD (Single instruction, multiple data) vector arithmetic, FFT (Fast Fourier Transform) Butterfly, affine operation, and dual linear interpolation. In some embodiments, the vector arithmetic unit of the present technology can be considered a complex multiply-accumulate unit (CMAC). The vector arithmetic unit of the present technology can be included in a floating point processor which executes program instructions, for example in a chip which performs digital signal processing in an audio device.

Embodiments of the present technology perform floating point operations. Multiple floating point multiplier units and multiple floating point adder units are provided. The adder units and multiplier units are interconnected to allow multiple floating point operations. The various interconnections may be implemented by full or partial crossbars. The multiple floating point operations can include an affine operation and a complex multiply-accumulate operation. The multiple floating point operations can also include a SIMD operation, dual linear interpolation operation, vector arithmetic, and FFT butterfly. The functionality of the crossbars is not limited to data permutations or re-orderings, but may include e.g. shifting operands as required to accommodate the data flow requirements for a wide range of floating point operations.

The present technology uses floating point formats to encode numbers. Often, floating point numbers are stored in 32 bits of memory per number. In order to conserve memory and/or extend the dynamic range of a floating point format, other or smaller representations of floating points may be used called "mini-floats". These format are especially advantageous for storing numbers. One of the characteristic properties of these formats is the use of a bias in the exponent field.

BRIEF DESCRIPTION OF THE DRAWINGS

FIG. 3 illustrates a table of exemplary representation of a partial crossbar in a vector floating point arithmetic unit.

FIG. 4 illustrates a table of exemplary representation of a partial crossbar in a vector floating point arithmetic unit.

FIG. 11A illustrates various floating point formats as used in the present technology.

FIG. 11B illustrates the weightings of mantissa bits in a 32-bit floating point format.

DESCRIPTION OF EXEMPLARY EMBODIMENTS

In some embodiments, the present technology includes an arithmetic unit that includes a flexible vector arithmetic unit to perform a set of floating point arithmetic operations efficiently. The unit can include multiple floating point multipliers and multiple floating point adders. An implementation of a unit may include four floating point multipliers and four multiple floating point adders. In some implementations, other numbers of multipliers and adders can be implemented. The multipliers and adders are interconnected in a flexible way to allow multiple operations, including SIMD (Single instruction, multiple data) vector arithmetic, FFT (Fast Fourier Transform) Butterfly, affine operation, and dual linear interpolation. In some embodiments, the vector arithmetic unit of the present technology can be considered a complex multiply-accumulate unit (CMAC).

Figure 2:
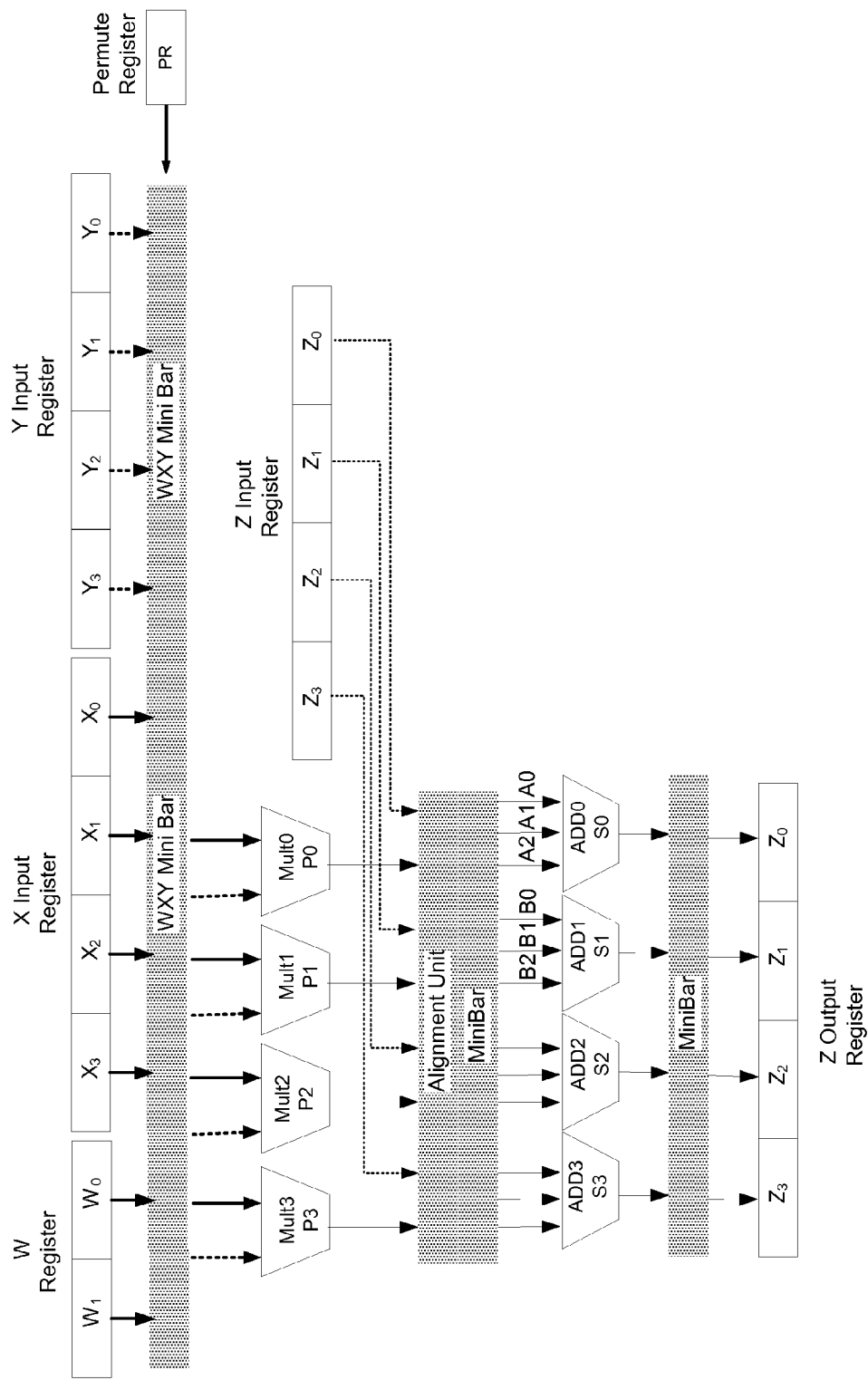
FIG. 2 illustrates an exemplary embodiment of a vector floating point arithmetic unit according to the present technology.

The input registers X and Y can be fed into a subset of a crossbar, called a partial crossbar, or "minibar". The input registers are connected to the WXY minibar in FIG. 2, to allow flexible routing of input operands to the multiplication units. Another minibar between the multipliers and the adders is responsible for providing the flexibility to select between different operations of the vector arithmetic unit, together with the alignment unit in FIG. 2. The output minibar allows for routing 32-bit adder output operands to whatever organization of the output Z register is required by the arithmetic operation. These three minibars are depicted in FIG. 2.

The vector arithmetic unit of the present technology combines several features. Floating point SIMD units are known in the art, as well as arithmetic units which are capable of performing some complex floating point multiply operations. There are only very few commercial processors that are capable of performing a fused floating point complex multiply and floating point accumulate, especially with the latency of two clock cycles and throughput of one cycle in the present technology at a particular clock speed. Presently available machines are not capable of performing an affine operation as well as a complex multiply accumulate, and an FFT butterfly. Additionally, the vector arithmetic unit of the present technology can perform linear interpolation operations as well.

The flexibility in the present technology arises primarily from the interconnections between the inputs and the multipliers and between the multipliers and the adders. These units are communicatively coupled with a subset of a crossbar called a minibar. A subset of a crossbar is used because a full crossbar is well known to be expensive in terms of power, wiring, and gates (i.e. silicon area), and several subsets of connections provide an ample choice of instructions, as will be explained in the present specification.

Figure 1:
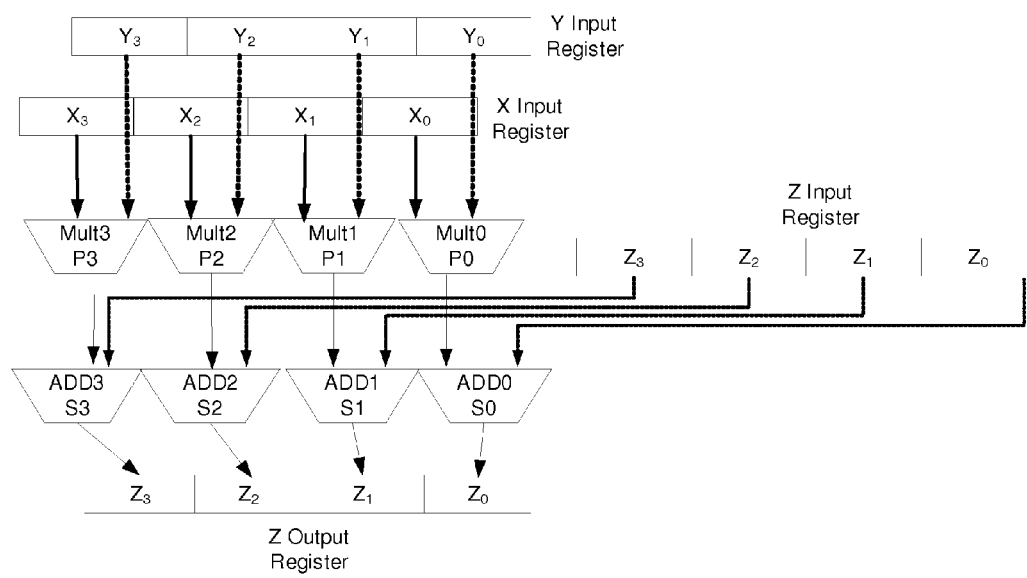
FIG. 1 illustrates an implementation of a vector arithmetic unit.

This vector arithmetic unit may include two stages: a multiplier stage containing for example four multipliers, and an addition stage containing for example four 3-way adders. Additional or fewer stages may also be implemented. In the following examples, four (32 bit) element registers are used as inputs (X register and Y register) and outputs (Z register), but the input element size could easily be other than 32 bit without loss of generality. Some of the inputs are routed to the four multipliers generating products P0, P1, P2, and P3. Other inputs are used as additive terms in the second stage, generating sums S0, S1, S2, S3. FIG. 1 is an exemplary implementation of a vector arithmetic unit. In the examples below the computations are performed in place, i.e. one of the input registers (Z) is also the output register. Two input registers are used, the X register and the Y register. A third register containing two element complex values (a total of 64 bits in this embodiment) called the W register can be used to improve efficiency for some operations, and is shown in this preferred embodiment. Each register may be 128-bits wide, consisting of four 32-bit sections (a.k.a. elements), labeled X3, X2, X1, X0 and Y3, Y2, Y1, Y0 respectively. Register Z may also be 128 bits wide, consisting of four 32-bit sections, labeled Z3, Z2, Z1, and Z0.

In some examples only the operations on the bottom half of the input/result vector registers is illustrated, i.e. X1, X0, Y1, Y0 and Z1, Z0. The adders that produce sums S0 and S1 can be referred to as a dual-adder, consisting of adder A for sum S0 and adder B for sum S1. The adders that produce sums S2 and S3 can be referred to as another dual-adder, consisting of another adder A to produce sum S2 and another adder B to produce sum S3.

The operation shown in FIG. 1 is Z=Z+XY. Commonly, each 32-bit section in a vector arithmetic unit as shown in FIG. 1 has sign factors sz $\{-1, 0, 1\}$ such that the following operation is implemented: $Zi=szi*Zi\pm Xi*Yi$, with $i\in\{0, 1, 2, 3\}$. Sign factors are not shown in FIG. 1. An additional, optional, input register shown in FIG. 2 is the so-called permutation register or permute register referred to as "PR" register. The permutation register PR typically contains 16 or fewer bits to control the minibar routing. Optional register W typically contains fewer bits than either of the X, Y, and Z registers, for example 64 bits, which form two 32-bit elements. Without using register W, the operation of an in-place vector arithmetic unit can generically be described as Z=F(Z, X, Y), wherein F is a mathematical function. With using register W, the operation can be described as Z=F(Z, W, X, Y). With using permutation register PR in addition to register W, the operation can be described as Z=F(Z, W, X, Y, PR). More specifically in FIG. 2, the operation of the vector arithmetic unit can be described separately per stage: P1=F1(X, Y, W[, PR]) and either Si=F2(P, Z) or Si=F3(P, Z, X, Y), with $i\in\{0, 1, 2, 3\}$.

The present vector arithmetic unit provides several computational options in several embodiments. Assume a given register Z has elements Z0, Z1, Z2, and Z3. Assume input vectors registers X and Y are multiplied to generate partial products P0, P1, P2, and P3. Let sign factors sz0, sz1, sz2, sz3$\in\{-1, 0, 1\}$ and sign factors sp0, sp1, sp2, sp3$\in\{-1, 1\}$. Note that these sign factors are not shown in FIG. 1 or FIG. 2. The vector arithmetic unit as presented includes instructions for the following computational operations by virtue of the flexibility provided through the use of partial crossbars (shown in FIG. 2):

1. Affine computations:
 low word output (AFF_L):
  a) Z0=sz0*Z0+sp0*P0+sp1*P1
  b) Z1=sz1*Z1+sp2*P2+sp3*P3
 or high word output (AFF_H):
  a) Z2=sz0*Z2+sp0*P0+sp1*P1
  b) Z3=sz1*Z3+sp2*P2+sp3*P3
2. Butterfly:
 low word additive term (BFLY_L):
  a) Z0=sz0*X0+sp0*P0+sp1*P1
  b) Z1=sz1*X1+sp2*P2+sp3*P3
  c) Z2=sz0*X0−sp0*P0−sp1*P1
  d) Z3=sz1*X1−sp2*P2−sp3*P3
 or high word additive term (BFLY_H):
  a) Z0=sz0*X2+sp0*P0+sp1*P1
  b) Z1=sz1*X3+sp2*P2+sp3*P3
  c) Z2=sz0*X2−sp0*P0−sp1*P1
  d) Z3=sz1*X3−sp2*P2−sp3*P3
3. SIMD:
  a) Z0=sz0*Z0+sp0*P0
  b) Z1=sz1*Z1+sp1*P1
  c) Z2=sz2*Z2+sp2*P2
  d) Z3=sz3*Z3+sp3*P3

The generation of the product terms and the specification of the sign factors helps define a particular operation. For example, if the four element input registers X and Y are considered to contain complex numbers (X0,X1) and (Y0, Y1), where the first element is real and the second element is imaginary, the following products can be produced: P0=X0*Y0, P1=X1*Y1, P2=X0*Y1, P3=X1*Y0. If in addition we define sz0=sz1=1, sp0=1, sp1=−1, sp2=1, sp3=1, the affine computation option as previously described, specifies a complex multiply-accumulate operation (a.k.a. CMAC operation). Using the previously described definitions, the specified butterfly operation is a radix-2 decimation-in-time (FFT) butterfly. To specify a SIMD operation we would also need to specify sz2 and sz3. One possible SIMD embodiment has the constraints sz0=sz1=sz2=sz3 and sp0=sp1=sp2=sp3, but another embodiment can be implemented in a more general way without any such constraints.

FIG. 3 illustrates a table representing an exemplary embodiment for the WXY minibar in FIG. 2. The input registers to the WXY minibar are X, Y, and W, and optionally the PR register. Note that registers X and Y have four elements each in this example, whereas register W only has two. The outputs of the WXY minibar are coupled with the inputs of the four multipliers. The multipliers are labeled with a number, and each multiplier has two inputs, which are labeled "a" and "b" in FIG. 3. The left-hand side of the table covers affine, butterfly and SIMD operations. The right-hand side of the table covers CMAC and linear interpretation operations.

The adders can be organized in several ways, in different embodiments. A convenient way to group the butterfly adders is into two dual adders: one for operations 2a and 2c, and the other for operations 2b and 2d. The first dual adder takes P0 and P1 as inputs, while the second one takes P2 and P3. Furthermore, the first dual adder can be used to perform 1a, or 3a and 3b. The second dual adder can be used to perform 1b, or 3c and 3d. These extensions do not modify the interface to the product terms.

Figure 5A:
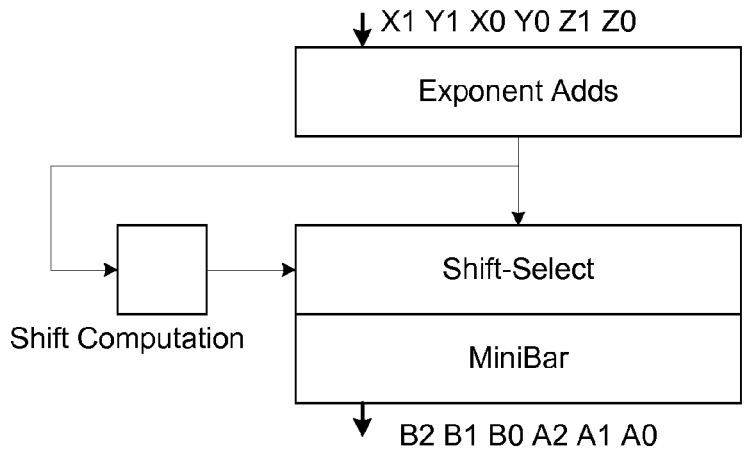
FIG. 5A illustrates an exemplary implementation of a partial crossbar which couples and shifts floating point multiplier outputs to create the inputs for the floating point adders according to the present technology.
Figure 5B:
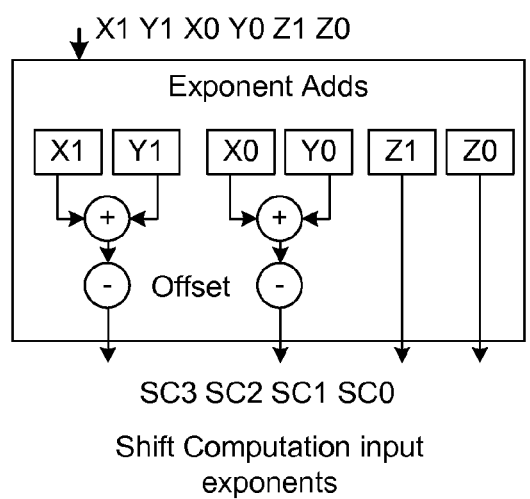
FIG. 5B illustrates an exemplary implementation of exponent processing as used in the present technology.
Figure 5C:
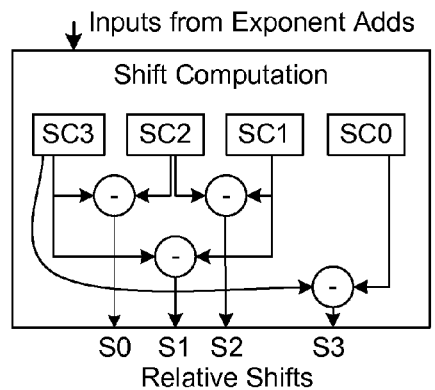
FIG. 5C illustrates an exemplary implementation of a shift computation as used in the present technology.
Figure 5D:
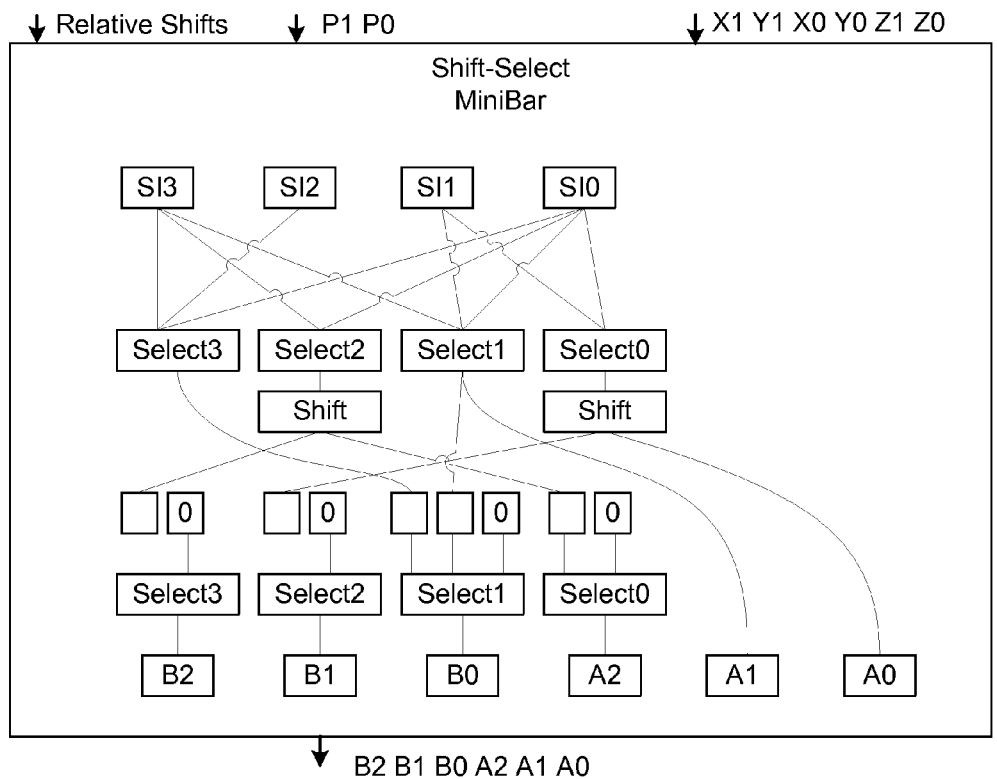
FIG. 5D illustrates an exemplary implementation of a combined shift-select and partial crossbar logic as used in the present technology.

Each dual adder may require part of the available data paths in the combined alignment unit and minibar as shown in FIG. 2 to perform the de-normalization needed for floating point addition. Details of exemplary implementations are in FIGS. 5A, 5B, and 5C. FIG. 5A illustrates how the exponents of operands are used to perform a shift computation, which is subsequently used to shift the mantissa of a selected operand by a number of bits based on the size of the exponents. Note that FIG. 2 contains two instances of the logic in FIG. 5A, which allows a dual affine or complex or 4-way SIMD operation to be performed in one cycle throughput. FIG. 5B illustrates more details of the exponent processing required to control the shift computation. FIG. 5C illustrates more details of the shift computation as used in the logic of FIG. 5A. For the affine and butterfly operations, a single three-way alignment (or shifting) can be performed. For the SIMD operation, 2 two-way alignments can be performed. The table in FIG. 4 illustrates how to map these operations on the hardware of FIG. 2. Alignment/shifting for any of the previously described computational options can be implemented with two shifters per dual adder, as shown in FIG. 5D, which illustrates the combined shift-select and minibar logic, as used in FIG. 5A. The term "Alignment Unit/MiniBar" in FIG. 2 denotes the same logic as the term "Shift-Select/MiniBar" in FIG. 5A, and both terms are used interchangeably throughout.

For each dual adder, the first adder is referred to as adder A, and the second adder is referred to as adder B. In FIG. 2 a dual adder generates sums S0 and S1. Denoting the corresponding dual-adder input terms A0, A1, A2, and B0, B1, B2, the table in FIG. 4 summarizes the input routing needed to support the described computational options. This routing is performed by the minibar in FIG. 5D. The appropriate routing of the adder output (using the output minibar in FIG. 2) completes the implementation of the desired operation.

Figure 6:
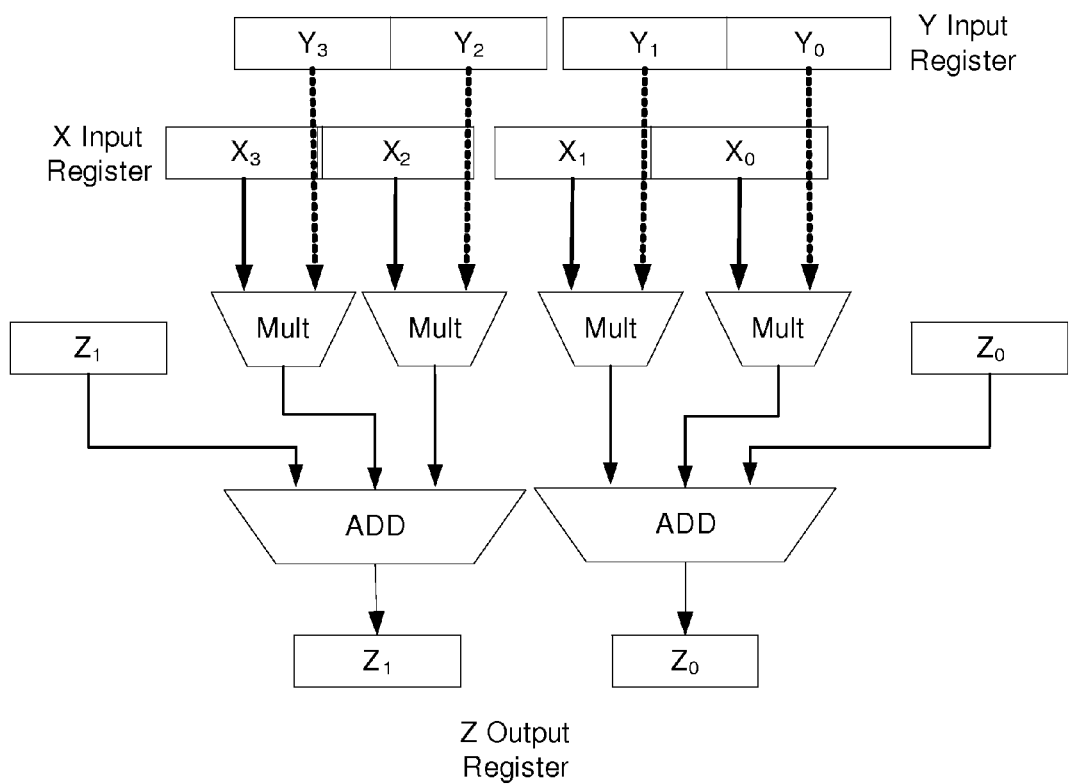
FIG. 6 illustrates an exemplary data flow within a vector floating point arithmetic unit for affine operations.
Figure 7:
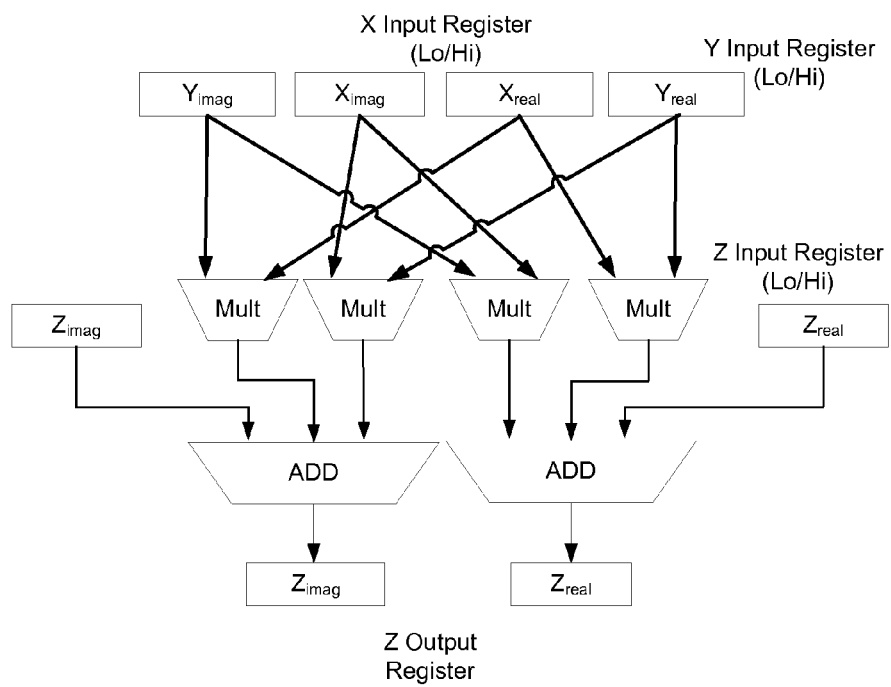
FIG. 7 illustrates an exemplary data flow within a vector floating point arithmetic unit for complex multiply-accumulate (CMAC) operations.
Figure 8:
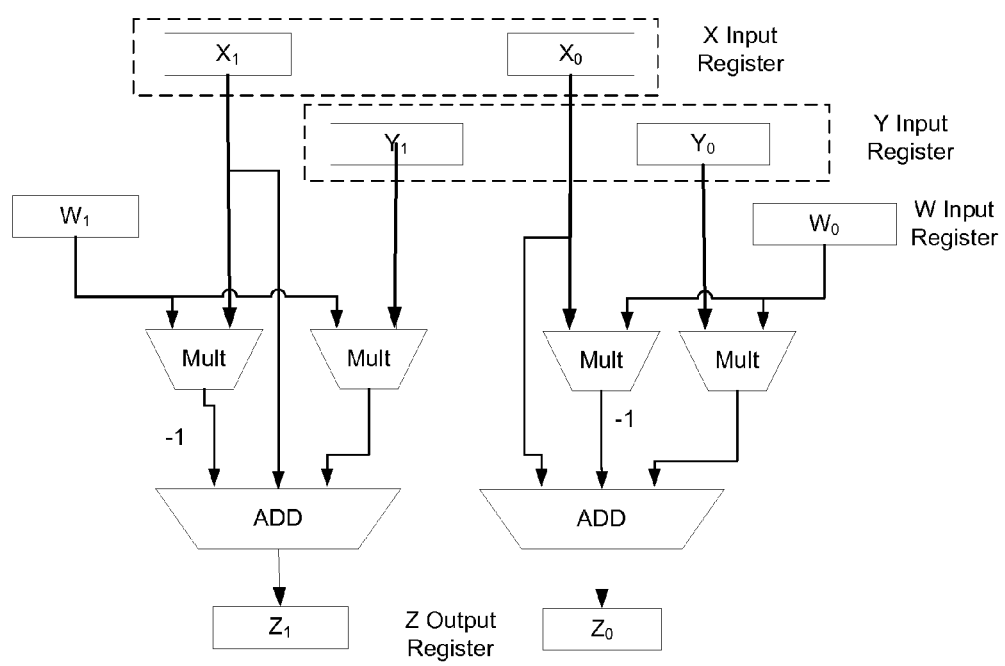
FIG. 8 illustrates an exemplary data flow within a vector floating point arithmetic unit for linear interpolation operations.
Figure 9:
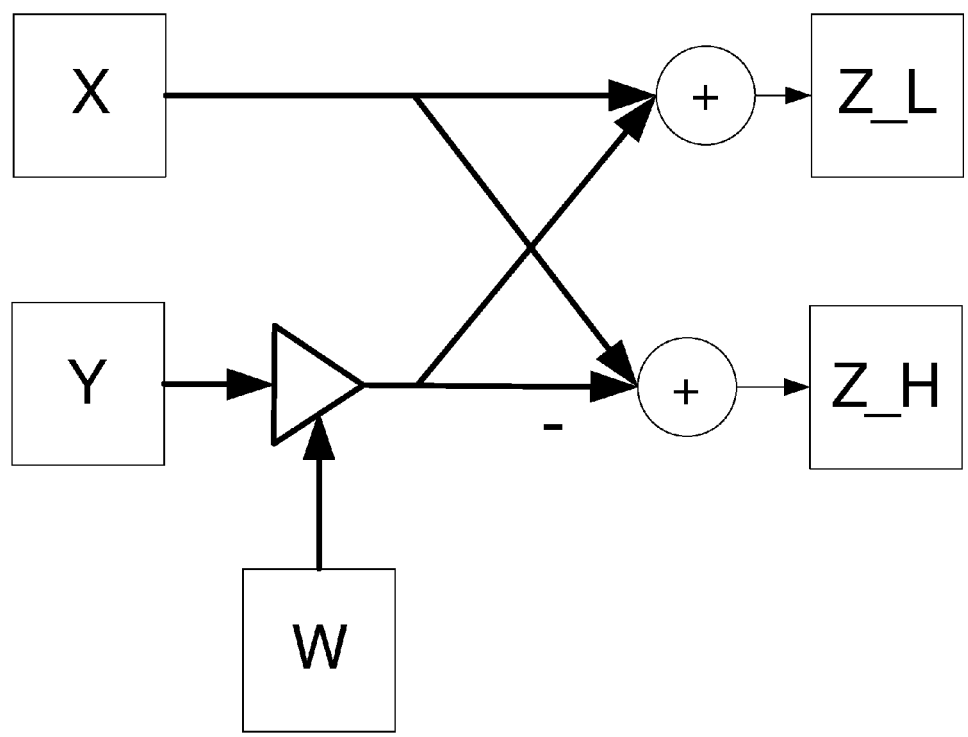
FIG. 9 illustrates an exemplary data flow within a vector floating point arithmetic unit for multiple (CMAC) operations to produce a butterfly operation.

FIG. 6 illustrates the data flow for the bottom (i.e. lower) half of the vector arithmetic unit outputs for an affine operation, which is characterized by the following two formulas: Z0=±Z0±(X0*Y0)±(X1*Y1), and Z1=±Z1±(X2*Y2)±(X3*Y3). As a specific example of an affine operation, FIG. 7 illustrates the data flow for a complex multiply-accumulate operation (CMAC), which is characterized by the following two formulas: Zreal=±Zreal±((Xreal*Yreal)−(Ximag*Yimag)), and Zimag=±Zimag±((Xreal*Yimag)+(Ximag*Yreal)). FIG. 8 illustrates the data flow for a linear interpolation operation, which is characterized by the following two formulas: Z0=W0*Y0+(1−W0)*X0, and Z1=W1*Y1+(1−W1)*X1. These formulas are implemented as follows: Z0=X0+W0*Y0−X0*W0, and Z1=X1+W1*Y1−X1*W1. FIG. 9 illustrates how a butterfly operation is implemented by combining two CMAC operations. The lower half of the result, Z_L, is defined as X+W*Y, whereas the upper half of the result, Z_H, is defined as X−W*Y. In this operation, any of the operands X, Y, and W may be complex.

Figure 10:
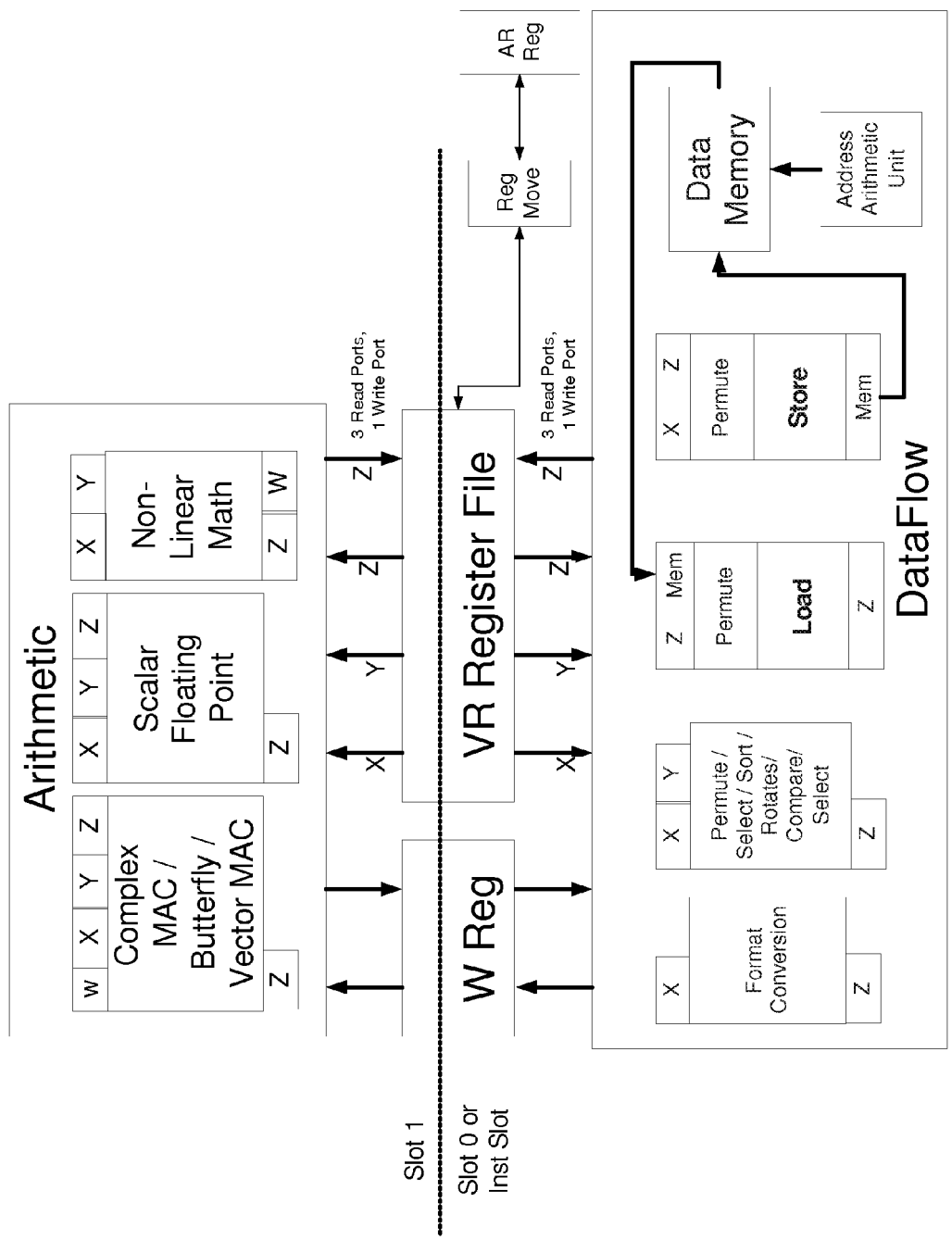
FIG. 10 illustrates an exemplary micro-architecture of a floating point processor which includes a vector floating point arithmetic unit.

FIG. 10 illustrates a floating point processor comprising two register files (the W register file, and the VR register file), a data memory and an arithmetic unit having a vector arithmetic unit as presented in this specification. The arithmetic unit may further comprise a scalar floating point unit and/or a non-linear mathematics unit. The floating point processor may include load logic, store logic and conversion logic, which can be configured to compress and decompress floating point operands according to various floating point formats, e.g. the formats shown in FIG. 11A.

The present technology uses floating point formats to encode numbers. Often, floating point numbers are stored in 32 bits of memory per number. In order to conserve memory and/or extend the dynamic range of a floating point format, other or smaller representations of floating points may be used called "mini-floats". These format are especially advantageous for storing numbers. One of the characteristic properties of these formats is the use of a programmable bias in the exponent field, which increases the range of the exponent, and therefore the dynamic range of a floating point format.

A floating point number typically has a sign bit, an exponent field, and a mantissa field. A number is then represented thus $$v=(-1)^{Sign}*2^{Exponent-Bias}*0.\{1 \text{mantissa}\}$$

Where:
s=+1 (non-negative numbers) when the sign bit is 0
s=−1 (negative numbers) when the sign bit is 1
Bias=31
Exp=Exponent+Bias
0≤Exponent+Bias≤63 (6 bit exponent field)
−31≤Exponent≤32

Mantissa=0.{1 mantissa} in binary (that is, the significand is a zero followed by the radix point followed by binary 1 concatenated with the binary bits of the mantissa). FIG. 11A illustrates various floating point formats using this representation, including uncompressed 32-bit floating points and 16-bit mini-floats. FIG. 11B illustrates the weights of the mantissa bits for the 32-bit floating point format of FIG. 11A. This floating point format provides 26 bits of precision (about 108 dB) over a dynamic range of about 385 dB, which is determined by the ratio of the maximum and minimum (smallest absolute value magnitude) number that can be represented in this format.

Due to the implicit bit, ½≤mantissa<1.0. In converting a 32-bit float to a mini-float, the decision has to be made as to how many bits of exponent and mantissa to keep, as well as what bias to use. For example, depending on the type of calculations to be performed, all floating point operands may be expected to be positive (e.g. if they signify an amount of energy or power in an audio signal). In this case no sign bit is needed for the associated mini-float format. FIG. 11A shows considerable flexibility in choosing a mini-float format (either 16 or 8 bits), wherein each choice has a particular set of minimum and maximum values, and dynamic range.

Figure 12A:
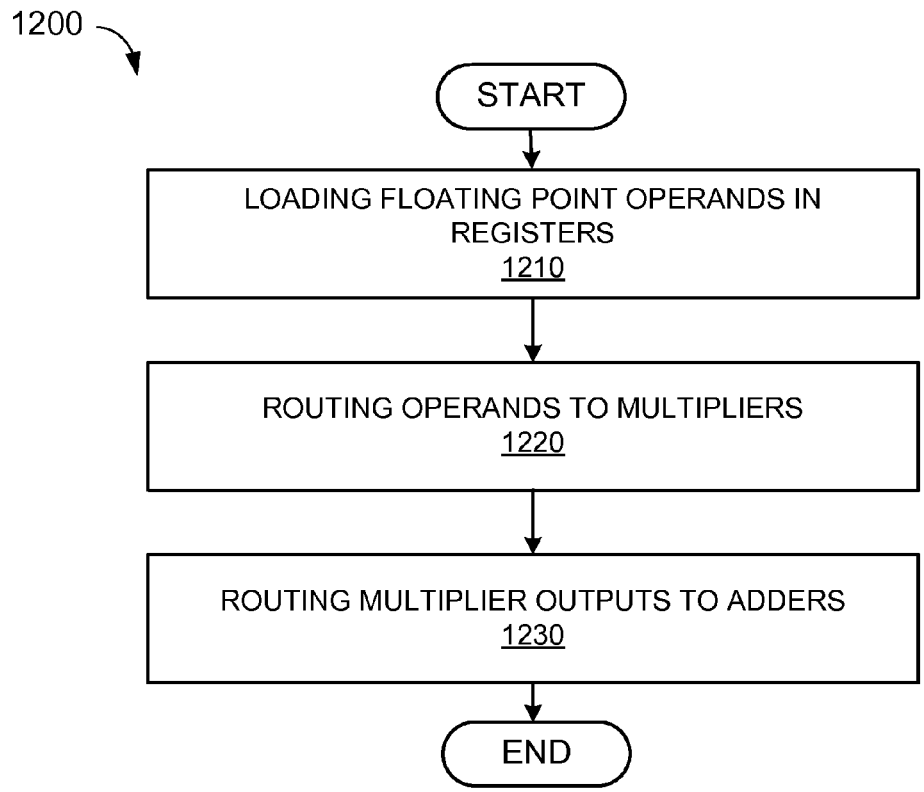
FIG. 12A illustrates a flow chart of an exemplary method for computation in an arithmetic unit.

FIG. 12A illustrates a flow chart of an exemplary method 1200 for computation in an arithmetic unit. The exemplary method 1200 includes loading floating point operands in registers (step 1210); routing operands to multipliers (step 1220); and routing multiplier outputs to adders (step 1230).

Figure 12B:
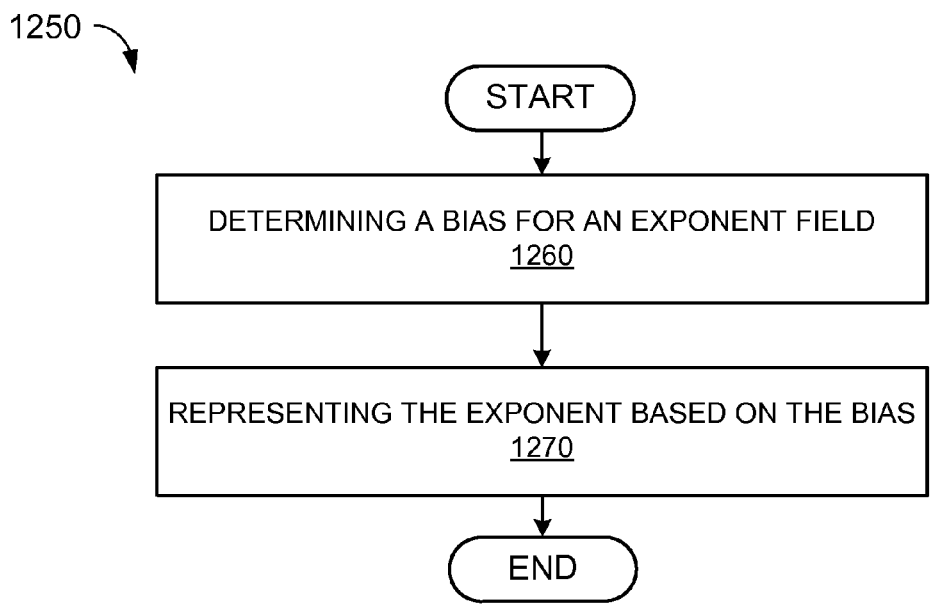
FIG. 12B illustrates a flow chart of an exemplary method for efficient representation of a floating point number with an exponent and a mantissa.

FIG. 12B illustrates a flow chart of an exemplary method 1250 for efficient representation of a floating point number with an exponent and a mantissa. The exemplary method 1250 includes determining a bias for an exponent field (step 1260) and representing the exponent based on the bias (step 1270).

Embodiments of the present technology distinguish from the prior art in that the current processing unit provides hardware support to convert standard (32 bit) floating point numbers to a completely flexible representation where the exponent bit width, bias value, and mantissa bit widths are completely determined at run time by the arguments to the instruction. Typically, hardware conversion to a mini-float format requires a limited number (1 or 2) pre-defined encoding sizes, contrary to the technology presented in this specification.

To maximize the efficient use of memory and/or bandwidth a flexible mini-floating point format is used for floating point storage. Depending on the application, the processor can store numerical data with a programmable number of exponent bits. Where the values can be negative or positive, a sign bit is also used. All remaining bits are used for the mantissa which also uses a hidden bit for all but the lowest exponent value (0), in which case the number is de-normalized. The exponent bias (offset) can also be programmed for additional flexibility, or set as a sticky bit, or alternatively programmable as a global register value which applies to a block of instructions.

In one embodiment of the present technology, the internal arithmetic format is a 32-bit float with a sign bit, a 6-bit exponent and a 26-bit mantissa including 1 hidden bit. The 32-bit float does not support de-normalized numbers, and the smallest (0) exponent and mantissa value is treated as zero. Instructions are provided to convert from the 32-bit floating point format to the 16-bit mini-float. In those conversion instructions, the number of exponent bits, the bias and whether or not a sign bit exists can be encoded in the instruction.

The primary format used for computation is the 32 bit format shown in FIG. 11A, which is also referred to as A-float or Audience-float. It has two characteristic properties in that 1) every bit pattern is a valid number representation, and 2) the inverse of every non-zero number in this format can also be represented in this format. Negative zero is treated as zero. In most cases, arithmetic operations generate only positive zeros for consistency, but negative zeros are treated as positive zeros.

Since the mantissa can be a value between ½ and 1.0 (for purposes of discussion only, other values are possible), the most significant bit mantissa bit can be a 1. This bit does not need to be stored in memory or registers, and can be discarded for storage. This bit is known as the "hidden bit" or "implicit bit" in traditional floating point nomenclature. During arithmetic operations, the internal data pipeline will restore the hidden bit to perform actual calculations, but this detail is invisible to the programmer.

| Example Values: | | | | |
|---|---|---|---|---|
| Value | Exponent + Bias | Exponent | Mantissa | Afloat(Value) |
| 8.0 | 35 | 4 | 0x1000000 $2^4 * 0.5$ | 0x46000000 |
| 4.0 | 34 | 3 | 0x1000000 $2^3 * 0.5$ | 0x44000000 |
| 2.0 | 33 | 2 | 0x1000000 $2^2 * 0.5$ | 0x42000000 |
| 1.0 | 32 | 1 | 0x1000000 $2^1 * 0.5$ | 0x40000000 |
| 0.5 | 31 | 0 | 0x1000000 $2^0 * 0.5$ | 0x3E000000 |
| 0.25 | 30 | −1 | 0x1000000 $2^{-1} * 0.5$ | 0x3C000000 |
| 0.125 | 29 | −2 | 0x1000000 $2^{-2} * 0.5$ | 0x3A000000 |

| Special Values can be as indicated below. | |
|---|---|
| Zero | Exp + bias = 0, mantissa = 0 |
| Max Value | Exp + bias = 63, mantissa = all ones (0x1FFFFFF) |

IEEE format uses a different scaling for the mantissa. In IEEE-754 format, for example, the mantissa is interpreted as between $1.0 <$ mantissa $< 2.0$.

De-normalized numbers are not supported for 32-bit floats. If exponent<0, and the mantissa=zero, then the number is interpreted as zero. The values of the mantissa in this smallest segment (where exponent=0) are still interpreted as being between ½ and 1.0 by pre-pending the hidden or implicit bit, except only for the case where the mantissa is exactly zero and the exponent is also zero.

Zero can be represented by exp+bias=0 and mantissa=0, and sign bit can be either 0 or 1. In sign magnitude systems, such as IEEE floats and A-floats, it is possible to have both a positive and a negative zero. In IEEE 754 floating point standard, zero is represented by the exponent=0. For this case, the mantissa is assumed to be zero. This is a different convention than with A-floats.

The floating point processor can implement bit-reverse ordering for the FFT, using the following guidelines for the implementation:

1. The computations must be done in place to save DRAM. Even in cases when the original data must be preserved the most likely scenario is that real data will be copied to a complex buffer passed to the FFT and/or a copy with format conversion will be performed.
2. The input and output must be in normal order. In most cases having the input in normal order and the output in bit-reverse order is adequate. However, keeping both in normal order is more user friendly.

The floating point processor implements features to make the bit-reverse step efficient, including 1) incorporate an in-place bit-reverse step with the first (radix-2) stage of the FFT without loss of efficiency, and 2) make the bit-reverse step loop over all indices needing bit-reversing rather than looping over all indices and performing an inefficient 'if' statement.

The implementation described herein makes use of a single vector load/store unit. The same main ideas above can be implemented with other memory interfaces such as dual load/store units.

In order to keep both input and output in normal order, bit-reverse addressing is used in one of the stages when the input and output are kept in separate buffers. With in-place computations there is no straightforward way to avoid overwriting other buffer elements. The simplest reordering is performed in a separate bit-reverse step such as:

```
for (ii=0; ii<N; ii++)//N: buffer size
{
    jj=bit_reverse(ii,log 2_N); //log 2_N=log 2(N),
        //number of bits in index
    if (ii<jj)
    {
        swap(buff[ii], buff[jj]);
    }
}
```

The reason for the 'if' statement above is that without it the reordering would occur twice and the buffer would end up in the original order. The problem with this separate bit-reverse step is that it may add 3N to 5N cycles to the FFT. This would be particularly detrimental for smaller values of N.

A convenient way of getting around this problem is to combine the bit-reverse step with the first stage of the FFT. Including the bit-reverse step in the first FFT stage reduces the required number of instructions significantly. However, the 'if' statements inside the loop are inefficient. The preferred embodiment of the vector arithmetic unit includes instructions that determine the next element index that needs bit-reversal based on a loop index or set of loop indices. These instructions do away with the need to use 'if' statements.

The present technology is described above with reference to exemplary embodiments. It will be apparent to those skilled in the art that various modifications may be made and other embodiments can be used without departing from the broader scope of the present technology. For example, embodiments of the present invention may be applied to any system (e.g., non speech enhancement system) utilizing AEC. Therefore, these and other variations upon the exemplary embodiments are intended to be covered by the present invention.

The invention claimed is:

1. A vector floating point arithmetic unit, comprising:
    a first crossbar accommodating data flow requirements for floating point operations; and
    a second crossbar accommodating the data flow requirements for floating point operations;
    wherein the first crossbar couples a plurality of input registers to a plurality of floating point multiplier units; and
    wherein the second crossbar couples and aligns output products of the plurality of floating point multiplier units to a plurality of floating point adder units, the plurality of floating point adder units having a set of adder inputs and having output sums.

2. The vector floating point arithmetic unit of claim 1, wherein the floating point operations include an affine operation and a complex multiply-accumulate operation.

3. The vector floating point arithmetic unit of claim 1, wherein the floating point operations include a Fourier Transform butterfly operation and a dual linear operation.

4. The vector floating point arithmetic unit of claim 2, wherein the floating point operations further include a Fourier Transform butterfly operation and a dual linear operation.

5. The vector floating point arithmetic unit of claim 1, wherein the output products and adder inputs include mantissas and exponents.

6. The vector floating point arithmetic unit of claim 5, wherein the second crossbar further comprises shifting logic configured to right-shift the mantissa of the output product based on the size of the exponent associated with the mantissa.

7. The vector floating point arithmetic unit of claim 5, wherein the second crossbar further comprises shifting logic configured to right-shift the mantissa of an adder input by a number of bits based on a difference between the exponent of the adder input and the largest exponent from the set of adder inputs.

8. The vector floating point arithmetic unit of claim 1, wherein a radix-2 decimation-in-time Fast Fourier Transform butterfly operation is performed in one clock-cycle throughput.

9. A method for computation in an arithmetic unit, the method comprising:
    routing, by a first crossbar configured to accommodate data flow requirements for floating point operations, at least part of a plurality of floating point operands to a plurality of multiplier units having output products; and
    routing, by a second crossbar configured to accommodate the data flow requirements for floating point operations, the output products of the plurality of multiplier units to a plurality of adder units having a set of adder inputs and having output sums.

10. The method of claim 9, wherein the floating point operations include affine operations and a complex multiply-accumulate operation.

11. The method of claim 10, wherein the floating point operations further include a radix-2 decimation-in-time Fast Fourier Transform butterfly operation and a dual linear operation.

12. The method of claim 9, wherein the output products and the plurality of adder inputs include mantissas and exponents.

13. The method claim 12, wherein the routing by a second crossbar further comprises right-shifting the mantissa of an adder input by a number of bits based on a difference between the exponent of the adder input and the largest exponent from the set of adder inputs.

14. A floating point processor, comprising:
    a register file with a read port and a write port;
    a data memory coupled to the register file; and
    an arithmetic unit coupled to the register file, comprising:
        a scalar floating point arithmetic unit, and
        a vector floating point arithmetic unit comprising:
            a first crossbar accommodating data flow requirements for floating point operations, the first crossbar coupling a plurality of input registers to a plurality of floating point multiplier units having output products,
            a plurality of floating point adder units having a set of adder inputs and having output sums, and
            a second crossbar accommodating data flow requirements for floating point operations, the second crossbar aligning and coupling the output products of the plurality of floating point multiplier units to the plurality of floating point adder units.

15. The floating point processor of claim 14, wherein the data memory is coupled to the register file through load logic, store logic, and conversion logic.

16. The floating point processor of claim 15, wherein the load logic and the store logic are configured to operate on compressed floating point operands.

17. The floating point processor of claim 16, wherein the conversion logic is configured to compress and decompress the floating point operands.

18. The floating point processor of claim 14, wherein the output products and adder inputs include mantissas and exponents, and wherein the second crossbar further comprises shifting logic configured to right-shift the mantissa of an adder input by a number of bits based on a difference between the exponent of the adder input and the largest exponent from the set of adder inputs.

19. A vector floating point arithmetic unit, comprising:
a plurality of floating point multiplier units having output products;
a first crossbar configured to accommodate data flow requirements for floating point operations, the first crossbar coupling a plurality of input registers to the plurality of floating point multiplier units;
a plurality of floating point adder units having a set of adder inputs and having output sums; and
a second crossbar configured to accommodate data flow requirements for floating point operations, the second crossbar coupling and aligning the output products of the plurality of floating point multiplier units to the plurality of floating point adder units.

* * * * *